United States Patent
Wang et al.

(10) Patent No.: US 12,197,565 B2
(45) Date of Patent: Jan. 14, 2025

(54) SPLIT LEDGER FOR SECURING EXTENDED REALITY ENVIRONMENTS

(71) Applicant: AT&T Intellectual Property I, L.P., Atlanta, GA (US)

(72) Inventors: Wei Wang, Harrison, NJ (US); Lars Johnson, Brooklyn, NY (US); Mikhail Istomin, Brooklyn, NY (US); Rachel Rosencrantz, Seattle, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 126 days.

(21) Appl. No.: 17/993,643

(22) Filed: Nov. 23, 2022

(65) Prior Publication Data

US 2024/0169051 A1    May 23, 2024

(51) Int. Cl.
*G06F 21/00* (2013.01)
*G06F 21/53* (2013.01)

(52) U.S. Cl.
CPC ........ *G06F 21/53* (2013.01); *G06F 2221/034* (2013.01)

(58) Field of Classification Search
CPC ....... G06Q 10/087; A63F 13/33; A63F 13/71; A63F 13/85; G06F 3/147; G06F 16/9024; G06F 21/64; G06F 21/53; G06F 21/554; G06F 2221/034; G09G 2358/00
See application file for complete search history.

(56) References Cited

U.S. PATENT DOCUMENTS

| | | | |
|---|---|---|---|
| 11,546,322 B1 * | 1/2023 | Hardjono | H04L 63/083 |
| 2021/0357386 A1 * | 11/2021 | Pratt | A63F 13/85 |
| 2022/0384027 A1 * | 12/2022 | Kaleal, III | A61B 5/11 |
| 2023/0254300 A1 * | 8/2023 | Silverstein | H04L 63/08 726/10 |
| 2023/0401312 A1 * | 12/2023 | Bakshi | G06F 21/554 |
| 2024/0114038 A1 * | 4/2024 | Balazs | H04L 63/1408 |

\* cited by examiner

*Primary Examiner* — William A Corum, Jr.
(74) *Attorney, Agent, or Firm* — Hartman & Citrin LLC

(57) ABSTRACT

The concepts and technologies disclosed herein are directed to providing a split ledger for securing extended reality ("XR") environments. According to one aspect, an XR server computer can create an XR environment. The XR server computer can cause a passed ledger to be populated with an environment ID associated with the XR environment. The XR server computer can cause a hash ledger to be populated with a first hash of the environment ID. The XR server computer can register a user for participating in the XR environment and can cause the passed ledger to be populated with a user-created block associated with the user. The XR server computer can cause the hash ledger to be further populated with a second hash of the user-created block. The XR server computer can allow a user avatar associated with the user to join the XR environment.

17 Claims, 9 Drawing Sheets

SPLIT LEDGER FOR SECURING EXTENDED REALITY ENVIRONMENTS

BACKGROUND

The advent of metaverse as a potential successor to the Internet will bring a number of changes. One foreseeable change is the way in which people interact with non-physical environments. Today, interactions with the Internet are limited to text and multimedia consumption (known as web2—read and write). This media is usually static in nature, such as webpages with multimedia (e.g., images, audio, and/or video). More dynamic interactions are either limited (e.g., forums, chat rooms, social media groups, and the like) or handled in a strictly-controlled environment (e.g., voice, video, and/or text chat and multiplayer games). Metaverse (also known as web3—read, write, own) will allow for more interactive environments (e.g., virtual rooms) that incorporate aspects of extended reality ("XR"), such as virtual reality ("VR"), augmented reality ("AR"), and mixed reality ("MR").

In recent years, the widespread adoption of the work-from-home model has had negative effects on some workers due to less in-person interaction with peers. XR technology provides a safe environment for co-workers to meet in a virtual space and interact as if in-person. This can increase morale and decrease the negative effects of isolation. Moreover, as the cost of XR headsets continues to decrease, XR technology will continue to become more commonplace, allowing friends and families to engage in social events, holidays, and daily social interactions.

Online privacy is a growing concern. The use of newer technologies, such as XR technology, may expose users to new privacy threats. Some users, however, take online privacy for granted and assume that others are indifferent about what they do or say online, and then are shocked to find out that their activity was noticed by advertisers, authorities, potential employers, and others.

SUMMARY

Concepts and technologies are disclosed that are directed to providing a split ledger for securing extended reality ("XR") environments. According to one aspect disclosed herein, an XR server computer can create an XR environment. The XR server computer can cause a passed ledger to be populated with an environment ID associated with the XR environment. The XR server computer can cause a hash ledger to be populated with a first hash. The first hash can include a hash function applied to the environment ID. The XR server computer can register a user for participating in the XR environment. The XR server computer can cause the passed ledger to be populated with a user-created block associated with the user. The user-created block can contain a user ID that uniquely identifies the user. The XR server computer can cause the hash ledger to be populated with a second hash. The second hash can include a hash function applied to the user-created block. The XR server computer can allow a user avatar associated with the user to join the XR environment.

The XR server computer also can cause the passed ledger to be populated with meeting information associated with a meeting to take place within the extended reality environment. The XR server computer can cause the passed ledger to be populated with an owner ID associated with an owner of the XR environment. The XR server computer can cause the hash ledger to be populated with the first hash further including the hash function applied to the meeting information and the owner ID.

The XR server computer can cause the passed ledger to be populated with an object block associated with an object. The XR server computer can cause the hash ledger to be populated with a third hash. The third hash can include the hash function applied to the object block.

The XR server computer can monitor data traffic incoming into and outgoing from the XR environment. The XR server computer can analyze the data traffic and determine whether the data traffic is in violation of a smart contract. In response to determining that the data traffic is in violation of the smart contract, the XR server computer can evict an offending entity. The offending entity can include the user or the object.

The XR server computer can allow the user avatar associated with the user to join the XR environment by providing the second hash to a user device. The user device stores a copy of the passed ledger. The user device can determine that the second hash has a match in the copy of the passed ledger.

The passed ledger and the hash ledger can be part of a split ledger. The hash ledger can be stored in a logging system. The logging system can be part of the XR server computer or a system separate from the XR server computer.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
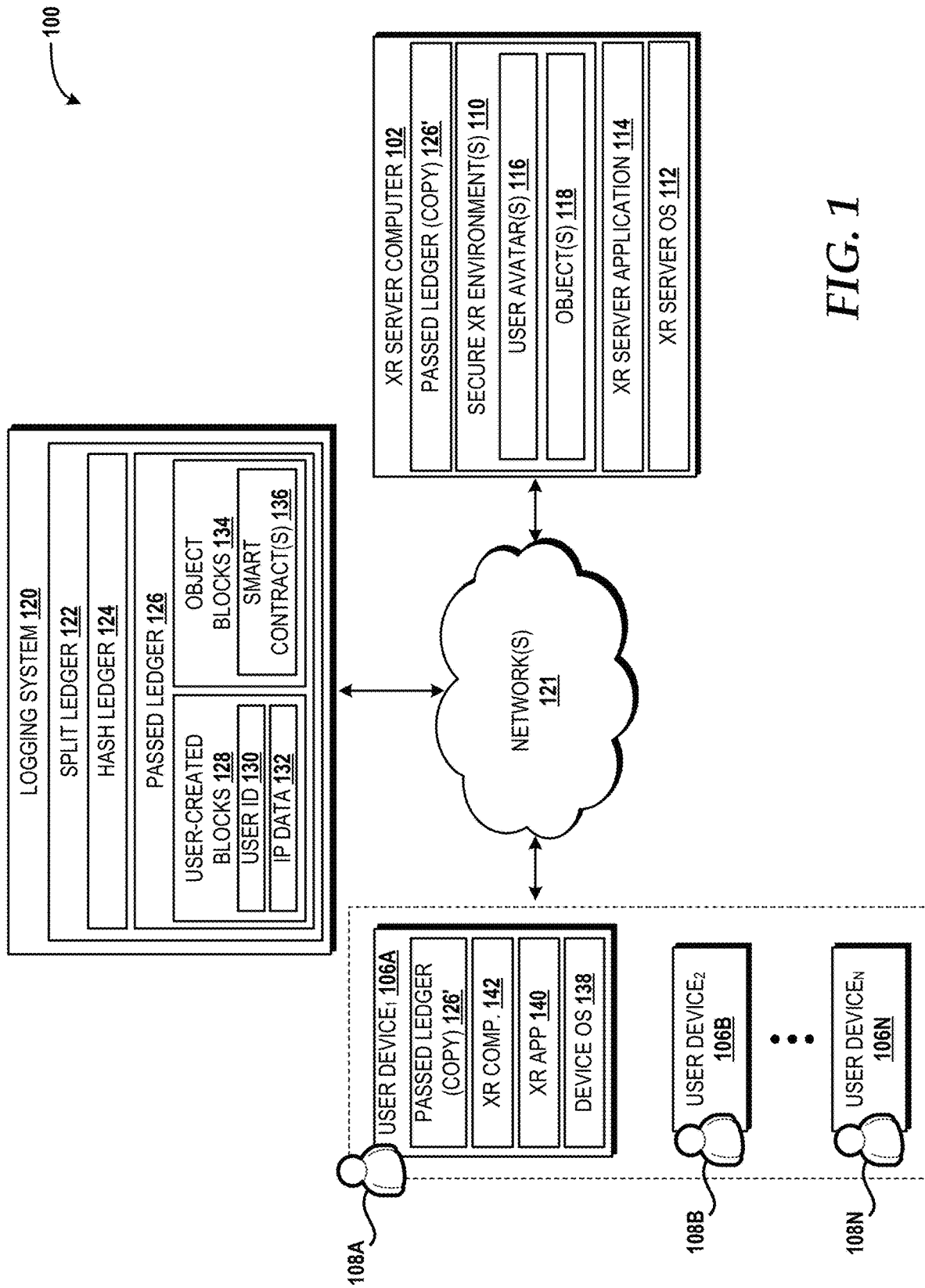
FIG. 1 is a block diagram illustrating aspects of an illustrative operating environment in which the concepts and technologies disclosed herein can be implemented.

The concepts and technologies disclosed herein are directed to a split ledger for securing XR environments. More particularly, the concepts and technologies disclosed herein provide a novel method through which a system can, on behalf of each user in an XR environment, quickly verify each object and person in the XR environment. The system can determine what is sharing information with the outside world and with whom. In this manner, the concepts and technologies disclosed herein can ensure the XR environment is secure.

When a user enters an XR environment, the user would like to assume that the XR environment is a secure place where only the people around the user will be able to listen to what the user says. A problem is that the user does not know who the people in the XR environment actually are, since the user can only see avatars of the actual people in the XR environment. Further complicating things is determining who are the real users and where are the real users, since a person's avatar may take any form that may not look like a person. An object in the XR environment may be an object that belongs to somebody, may be a person's avatar, or may be a malicious object recording activity in the XR environment. Regardless of who is who and what objects are in the XR environment, a problem is that if the user wants to be in a secure space, they need to know who is with them, what they own in the space, and what each other's object is doing in the space.

In an effort to solve the aforementioned problems, a modified version of a split ledger can be used. In addition, the use of smart contracts can be used to define security parameters for the secure XR environment. In this use case, when a server creates a secure XR environment with nothing in it, the server creates both a passed ledger and a hash ledger. Each person can add a block to the passed ledger and share it with the other people in the XR environment. Each person's entry will have information about their identity and the IP traffic information needed to ensure that they are still themselves. Any person in the room may introduce objects into the room such as non-fungible tokens ("NFTs") and common items that may be used to facilitate the reason for the room in the first place. Each object can have a smart contract written to the passed ledger that would describe what the object is, who owns the object, and what communications are allowed.

Each participant and potentially the server (depending on implementation) can have a full copy of the passed ledger and can share any additional blocks with other people in the room. Each person can routinely request the hash ledger from the server to verify their version of the passed ledger remains up to date. If it is out of date, they can request an update from their peers. If the peers fail to produce a valid passed ledger then the room would cease to exist and the participants would reconvene in a new room. If the security parameters of the room defined by the smart contract are violated, the room would be ended or the peers would be sent a warning and have the choice to leave.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

Referring now to FIG. 1, aspects of an operating environment 100 in which various embodiments presented herein may be implemented will be described, according to an illustrative embodiment. The illustrated operating environment 100 includes an XR server computer 102 that can provide an XR service to a plurality of user devices 106A-106N (hereafter referred to collectively as "user devices 106" or individually as "user device 106") associated with a plurality of users 108A-108N, respectively (hereafter referred to collectively as "users 108" or individually as "user 108"). The XR service can be a virtual reality ("VR") service, an augmented reality ("AR") service, a mixed reality service, or any combination thereof. The XR service can create secure XR environments 110 in which the users 108 can interact with each other and/or with other entities (not shown) such as businesses.

The XR server computer 102 can execute an XR server operating system ("OS") 112 and one or more application programs such as an XR server application 114. The XR server OS 112 is a computer program for controlling the operation of the XR server computer 102. The XR server application 114 is an executable program configured to execute on top of the XR server OS 112 to provide various functions described herein.

"Virtual reality" or "VR" is used herein to describe a concept that provides a computer-generated environment (also referred to herein as a "virtual environment") that the users 108 can explore via the user devices 106. A virtual environment can include a gathering of many individual objects that represent small parts of the overall environment. A virtual environment may be a single room, a house, a city, a world, or any other virtualization of a real-world environment. The virtual environment may be a completely imaginary environment that does not have a real-world analog. The virtual environment may be a combination of real-world and imaginary environments. A virtual object can represent any real-world object, such as furniture, individual avatars (i.e., representations of real-world users), animals (e.g., virtual pets and wildlife), vehicles, electronics, and the like. Each virtual object may belong to a virtual environment. A virtual object may be something that was created as part of the virtual environment. Alternatively, a virtual object may be something that was added at a later point by either the environment owner or another user.

A VR environment can be generated by any software framework designed for the creation and development of graphics. Some example software frameworks include, but are not limited to, UNREAL ENGINE (available from Epic Games, Inc.), UNITY (available from Unity Technologies), CRYENGINE (available from Crytek), HAVOK VISION ENGINE (available from Havok), and open source software frameworks. In some embodiments, the software frameworks utilize graphics assets, such as textures, that include or are derived from photographs of the real-world environment that is to be virtualized. Those skilled in the art will appreciate the wide range of graphical fidelity, visual styles, and other attributes a particular VR environment may have, and as such, further details in this regard are not provided herein.

"Augmented reality" or "AR" is used herein to describe a concept in which at least a portion of a physical, real-world environment is augmented to include computer-generated data. The computer-generated data can include virtual objects that are presented over and/or spatially integrated with real-world objects of the physical, real-world environment. The virtual objects can include text, colors, patterns, gradients, graphics, other images, videos, animations, combinations thereof, and the like. Computer-generated data that augments in some manner a view of a physical, real-world environment and/or elements thereof is referred to herein generally as an "augmentation."

The AR service can provide a live view of a physical, real-world environment. In these embodiments, the AR service may utilize a camera component (best shown in FIG. 6) of the user device 106 to provide a live view of the physical, real-world environment to be augmented. In other embodiments, the AR service can provide a non-live view of a physical, real-world environment. In these embodiments, the non-live view can present a physical, real-world environment as a static image. Accordingly, a reality that is to be augmented need not be a present reality and can instead be a past reality, encapsulated in a photograph that is augmented at a later time such as the present, for example.

"Mixed reality" is used herein to describe a concept in which elements of VR and elements of AR are used together. The term "XR" is used herein to refer to VR-only, AR-only, or mixed reality.

In the illustrated example, the XR server computer 102 provides the secure XR environment(s) 110 (hereafter referred to collectively as "secure XR environments 110" or individually as "secure XR environment 110") in which one or more user avatars 116 (hereafter referred to collectively as "user avatars 116" or individually as "user avatar 116"), which are digital representations of one or more of the users 108, can interact with each other and/or one or more objects 118 (hereafter referred to collectively as "objects 118" or individually as "object 118"). The objects 118 can include any XR object represented in the secure XR environment 110. Generally, the secure XR environment 110 may provide a space in which the users 108, via the user avatars 116, can interact with each other, and possibly one or more of the objects 118, through chat, interactive games, and/or other activities. In some embodiments, a meeting can be scheduled by one or more of the users 108, one of whom can be the meeting organizer/leader. The meeting can include a specific date, time, duration, invitees (e.g., other users 108), and other information to identify the user avatar(s) 116 and the object(s) 118 invited to the meeting.

Figure 5:
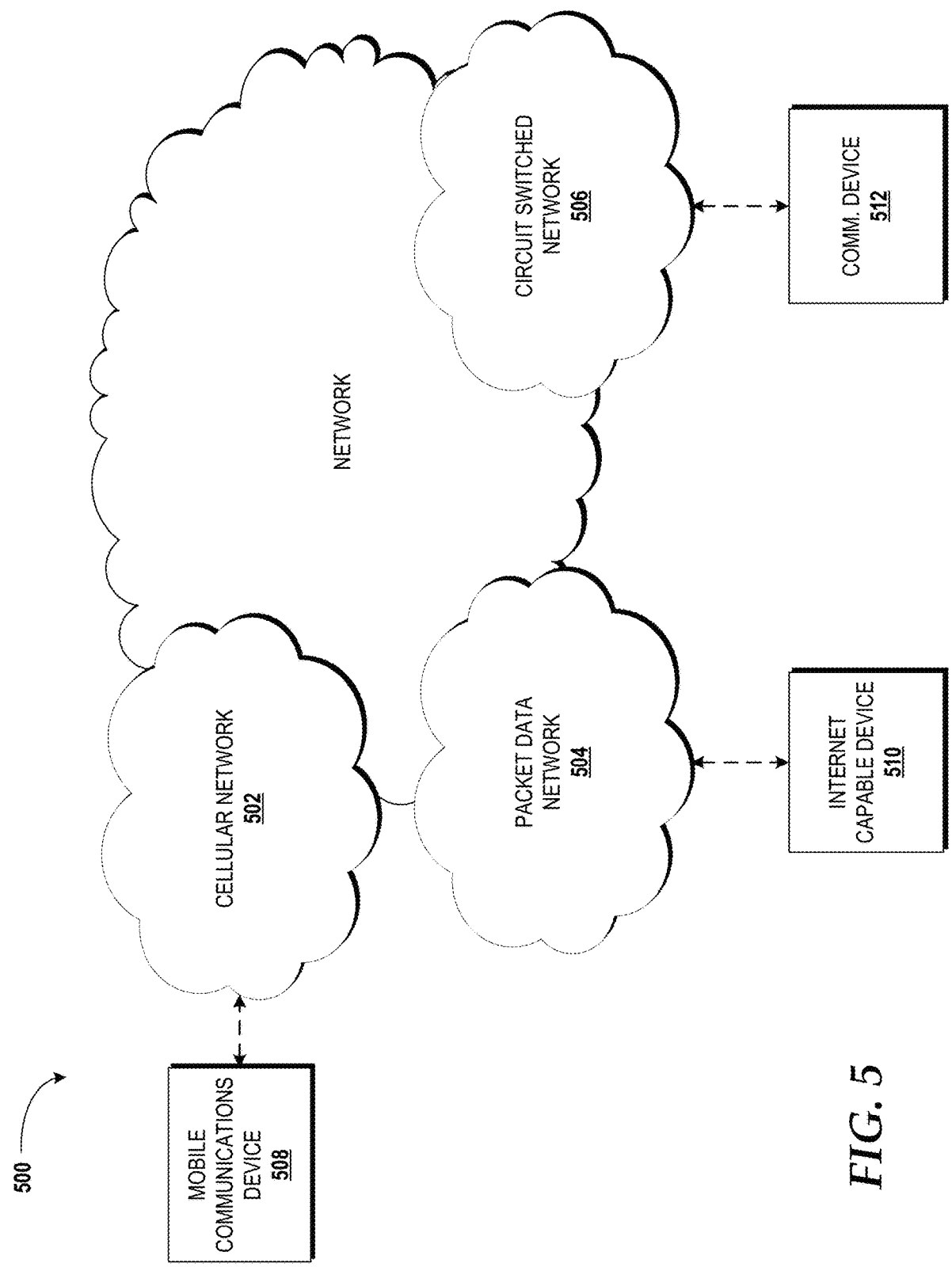
FIG. 5 schematically illustrates a network, according to an illustrative embodiment.

The XR server computer 102 can interact with a logging system 120 via one or more networks 121 (best shown in FIG. 5). The logging system 120 can, on behalf of each of the users 108 in the secure XR environment 110, verify each object 118 and user avatar 116 in the secure XR environment 110. The logging system 120 can determine what is sharing information with the outside world and with whom. In this manner, the XR server computer 102 and the logging system 120 can together ensure that the secure XR environment 110 is and remains secure. Although the XR server computer 102 and the logging system 120 are shown as separate systems, the functionality of the logging system 120 can be provided by the XR server computer 102. As such, the XR server computer 102 and the logging system 120 can be combined. Alternatively, the XR server computer 102 and the logging system 120 can operate independently, such as shown in the illustrated embodiment.

The illustrated logging system 120 utilizes a split ledger 122. When the XR server computer 102 creates a new secure XR environment 110, such as to facilitate a meeting among two or more of the users 108, the XR server computer 102 instructs the logging system 120 to create the split ledger 122 for that secure XR environment 110. The split ledger 122 includes a hash ledger 124 and a passed ledger 126. A copy of the passed ledger 126' can be stored on the user devices 106 and the XR server computer 102 such as in the illustrated example.

The passed ledger 126 can contain user-created blocks 128 created by each of the users 108 who plan to enter, via respective user avatars 116, into the secure XR environment 110. Each of the user-created blocks 128 can include a user ID 130 and IP data 132. The user IDs 130 can uniquely identify the users 108. The user IDs 130 can be a user name, a real name, or any combination of numbers, letters, and/or symbols. The IP data 132 can include an IP address of the user device 106, a geographic location associated with the IP address, other IP data, or a combination thereof. The user-created blocks 128 can be shared with the other users 108 via the passed ledger 126.

The passed ledger 126 also can include object blocks 134. Any user 108 can introduce one or more of the objects 118 into the secure XR environment 110. The objects 118 can be governed by smart contracts 136 in the object blocks 134. The smart contracts 136 can be used to define security parameters for the secure XR environment 110. The smart contracts 136 can describe what the object 118 is, who owns the object 118, and what data communications the object 118 is allowed. In some embodiments, the objects 118 can be non-fungible tokens ("NFTs"). The objects 118 can be other, common items that may be used to facilitate the reason the secure XR environment 110 was created. For example, the objects 118 may be virtual furniture used to conduct a meeting within the secure XR environment 110.

Each user 108 can routinely request the hash ledger 124 from the logging system 120 to verify that their version of the passed ledger 126' remains up to date. If the passed ledger 126' is out of date, the user 108 can request an update from their peers (i.e., other users 108). If the peers fail to produce a valid passed ledger 126, then the secure XR environment 110 can be shut down and the participants can reconvene in a new secure XR environment 110. If the security parameters of the secure XR environment 110 defined by the smart contract 136 are violated, the secure XR environment 110 can be shut down or the peers can be sent a warning and have the choice to stay or leave.

The illustrated user devices 106 can be or can include one or more mobile telephones, smartphones, tablet computers, slate computers, smart watches, fitness devices, smart glasses (e.g., the GOOGLE GLASS family of products), a dedicated AR device, a dedicated VR device, a dedicated mixed reality device, a wearable device, mobile media playback devices, laptop computers, notebook computers, ultrabook computers, netbook computers, computers of other form factors, computing devices of other form factors, other computing systems, other computing devices, and/or the like. It should be understood that the functionality of the user devices 106 can be provided by a single device, by two or more similar devices, and/or by two or more dissimilar devices. For purposes of describing the concepts and technologies disclosed herein, the user devices 106 are described herein as a smartphone. It should be understood that this embodiment is illustrative, and should not be construed as being limiting in any way.

In the illustrated example, a first user device 106A includes a device OS 138, an XR app 140, and an XR component 142. The other user devices 106B-106N can be configured the same as or similar to the first user device 106A. It should be understood, however, that the user devices 106 can include other components. Illustrative example architectures of the user devices 106 are described in greater detail herein with reference to FIGS. 4 and 6.

The device OS 138 can control the operation of the user device 106. In some embodiments, the device OS 138 includes the functionality of the XR app 140. The device OS 138 can be executed by one or more processors (best shown in FIGS. 4 and 6) to cause the user device 106 to perform various operations. The device OS 138 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The XR app 140 can execute on top of the device OS 138. The XR app 140 can be executed by one or more processors (best shown in FIGS. 4 and 6) to cause the user device 106 to perform various operations described herein. The XR app 140 can be a client-side application that communicates, via the network(s) 121, with the XR server application 114 executing on the XR server computer 102 to provide, at least in part, an XR service to the user 108 of the user device 106. The XR app 140 can be a client-side application that communicates, via the network(s) 121, with the XR server application 114 executing on the XR server computer 102 to provide, at least in part, an XR service to the user 108 of the user device 106. The XR app 140, in some embodiments, can utilize the XR component 142 to provide, at least in part, an XR service to the user 108 of the user device 106. The illustrated embodiment of the XR component 142 represents the XR component 142 as an internal component of the user device 106. It should be understood that the XR component 142 alternatively may be an external component that is in communication with the user device 106 via a wired or wireless connection.

The XR component 142, in some embodiments, is or includes a camera (e.g., a still camera and/or video camera), a sensor (e.g., an accelerometer, a global positioning system sensor, a solid state compass, or the like), a display (e.g., an integrated display, a head-mounted display, an eyeglasses display, a head-up display, an external monitor, a projection system, or a holographic display), an input device, or the like. The XR component 142, in other embodiments, is or includes a display (e.g., an integrated display, a head-mounted display, an eyeglasses display, a head-up display, an external monitor, a projection system, or a holographic display), an input device, a combination thereof, or the like. In some embodiments, the XR component 142 is META QUEST (available from META), PLAYSTATION VR (available from SONY), HTC VIVE (available from HTC and VALVE), MICROSOFT HOLOLENS (available from MICROSOFT), or the like. The XR app 140 can provide an interface, using the XR component 142, through which the user 108 can interact with the secure XR environment 110 provided, at least in part, by the XR server computer 102.

Figure 2A:
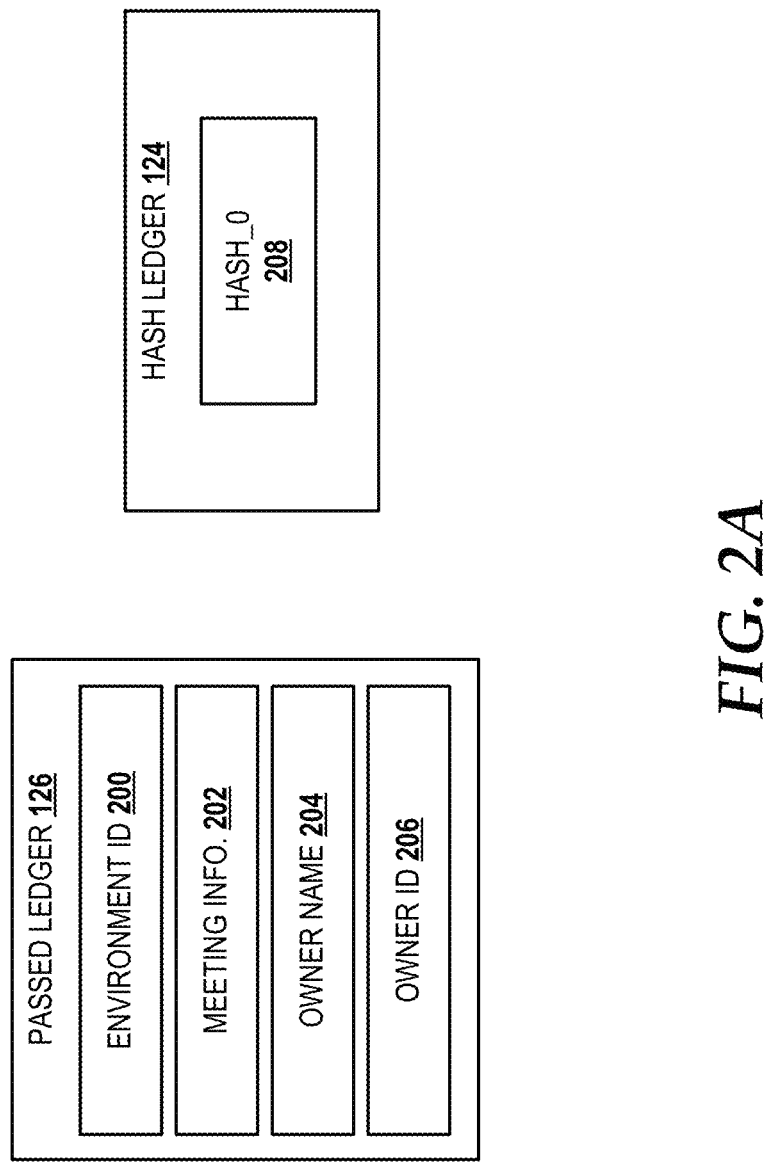
FIG. 2A is a block diagram illustrating the passed ledger and the hash ledger during an XR environment creation process, according to an illustrative embodiment.

Turning now to FIG. 2A, a block diagram illustrating the passed ledger 126 and the hash ledger 124 during an XR environment 110 creation process will be described, according to an illustrative embodiment. When the XR server computer 102 creates a new secure XR environment 110 (e.g., an empty virtual meeting room), the passed ledger 126 can be populated with an environment ID 200 (e.g., "secure_room_123"), meeting information 202 (e.g., meeting start time, meeting end time, meeting invitees, meeting objects, and/or the like), owner name 204 (e.g., the user 108 that owns the secure_room_123), and an owner ID 206 that uniquely identifies the owner. The hash ledger 124 contains "hash_0" 208 that is calculated based on the data including the block(s) (e.g., the user-created block(s) 128 and/or the object block(s) 134) that contain(s) the environment ID 200, the meeting information 202, the owner name 204, and the owner ID 206. A hash is a forward-only function that can be used to quickly verify that the contents have not been changed. The specific function for calculating the hash can be chosen based upon the needs of a given implementation. By way of example, and not limitation, the hash function can be SHA-256, SHA-512, sorting hash function, MD-5, or the like.

Figure 2B:
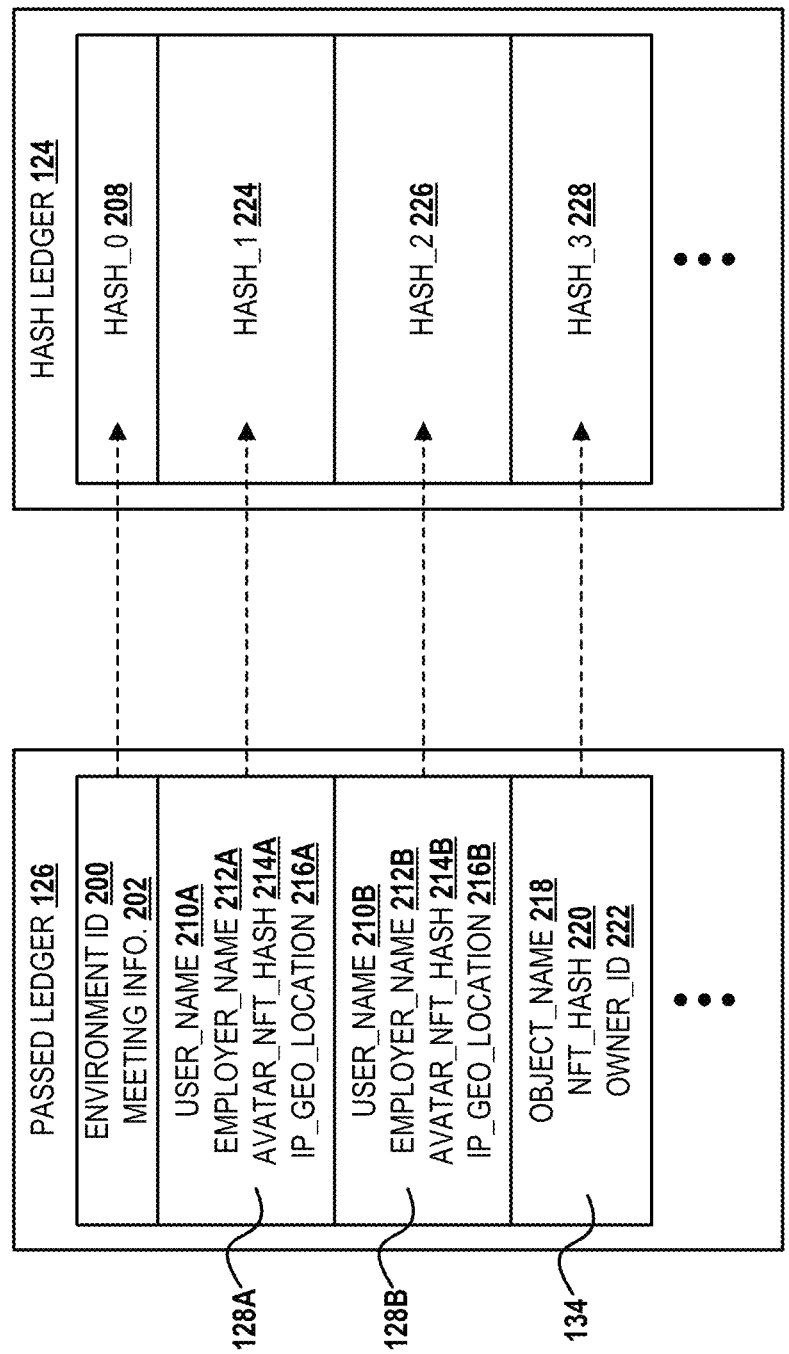
FIG. 2B is a block diagram illustrating the passed ledger and the hash ledger during a registration process, according to an illustrative embodiment.

Turning now to FIG. 2B, a block diagram illustrating the passed ledger 126 and the hash ledger 124 during a registration process will be described, according to an illustrative embodiment. The passed ledger 126 includes the environment ID 200 and the meeting information 202 that forms, in part, the room hash 208 (shown as "hash_0"). The passed ledger 126 also includes a first user-created block 128A associated with a first user 108A and a second user-created block 128B associated with a second user 108B. Each of the user-created blocks 128A, 128B includes a user_name 210A, 210B (e.g., a user ID 130), an employer_name 212A, 212B (if applicable), an avatar_nft_hash 214A, 214B (e.g., a user avatar 116 as an NFT), and an IP_geo_location 216A, 216B. In the illustrated example, the hash ledger 124 contains a hash_1 224 of the first user-created block 128A and a hash_2 226 of the second user-created block 128B. The passed ledger 126 can include any number of user-created blocks 128. The hash ledger 124 can include a number of hashes equal to the number of blocks in the passed ledger 126.

The passed ledger 126 also includes an object block 134 associated with an object 118. The object block 134 includes an object_name 218, an nft_hash 220, and an owner_ID 222. In the illustrated example, the hash ledger 124 contains a hash_3 228 of the object block 134. The passed ledger 126 can include any number of object blocks 134. The hash ledger 124 can include any number hashes associated with the object blocks 134.

Figure 2C:
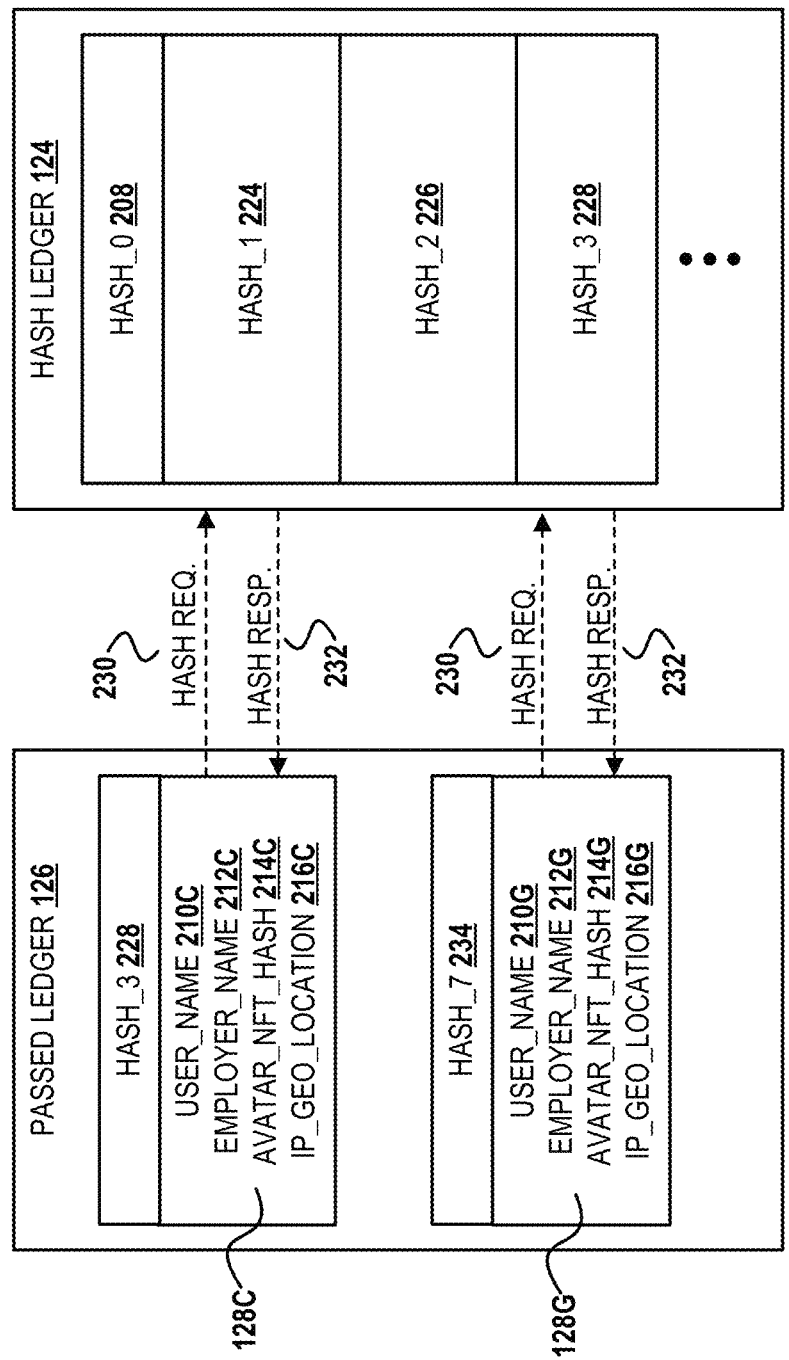
FIG. 2C is a block diagram illustrating the passed ledger and the hash ledger during a joining process, according to an illustrative embodiment.

Turning now to FIG. 2C, a block diagram illustrating the passed ledger 126 and the hash ledger 124 during a user/object joining process will be described, according to an illustrative embodiment. The hash ledger 124 is not aware of the contents of the passed ledger 126. Each user device 106, having a full copy of the passed ledger 126' can calculate a hash of each block and can compare those hashes to the hashes recorded in the hash ledger 124. The mechanism for a block to be written to the passed ledger 126 may depend on the use case, but regardless, a block that has been accepted (i.e., accepted by the creator, by an AI, by the room and its governing smart contract 136, etc.) will submit the hash to the hash ledger 124. The hash ledger 124 has a permission set to allow a specific user or super user (e.g., a host of a meeting in the secure XR environment 110) to write to the hash ledger 124. Other interactions include user requests for a specific block hash and the hash ledger 124 provides it. It is up to the user 108 then to verify that the passed ledger 126 stored on their respective device 106 is correct.

In the illustrated example, the passed ledger 126 includes a third user-created block 128C and a seventh user-created block 128G. A third user device 106C associated with the third user 108C can calculate a hash_3 228 and request the hash_3 228 from the hash ledger 124 via a hash request 230 directed to the hash ledger 124. The hash ledger 124, in turn, can respond with a hash response 232 including the hash_3 228 stored in the hash ledger 124. In the illustrated example, the hash_3 228 received in the hash response 232 from the hash ledger 124 matches the hash_3 228 stored in the passed ledger 126.

A seventh user device 106G associated with a seventh user 108G can calculate a hash_7 234 and request the hash_7 234 from the hash ledger 124 via another hash request 230. The hash ledger 124, in turn, can respond with another hash response 232. In the illustrated example, the hash ledger 124 does not include the hash_7 234.

When a user 108 is in a room (e.g., the secure XR environment 110), the user 108 can quickly determine the number of unique elements in the room. Each item, be it an avatar, a device, or furniture, will be recorded in a block. Each block will set out what is allowed for that element. If someone tries to add an item, then it would only appear if it is in the passed ledger 126. If the users 108 do not see the passed ledger 126 agreeing with the hash ledger 124 (such as in the example above with the hash_7 234), then the users 108 can either work to fix the ledgers or leave the room. If an element's block is altered to allow it more freedom, then the hash of the block would change, again setting it at odds with the hash ledger 124. The hash ledger 124 is not aware of what the blocks contain, only the correct hash of those contents.

Figure 3:
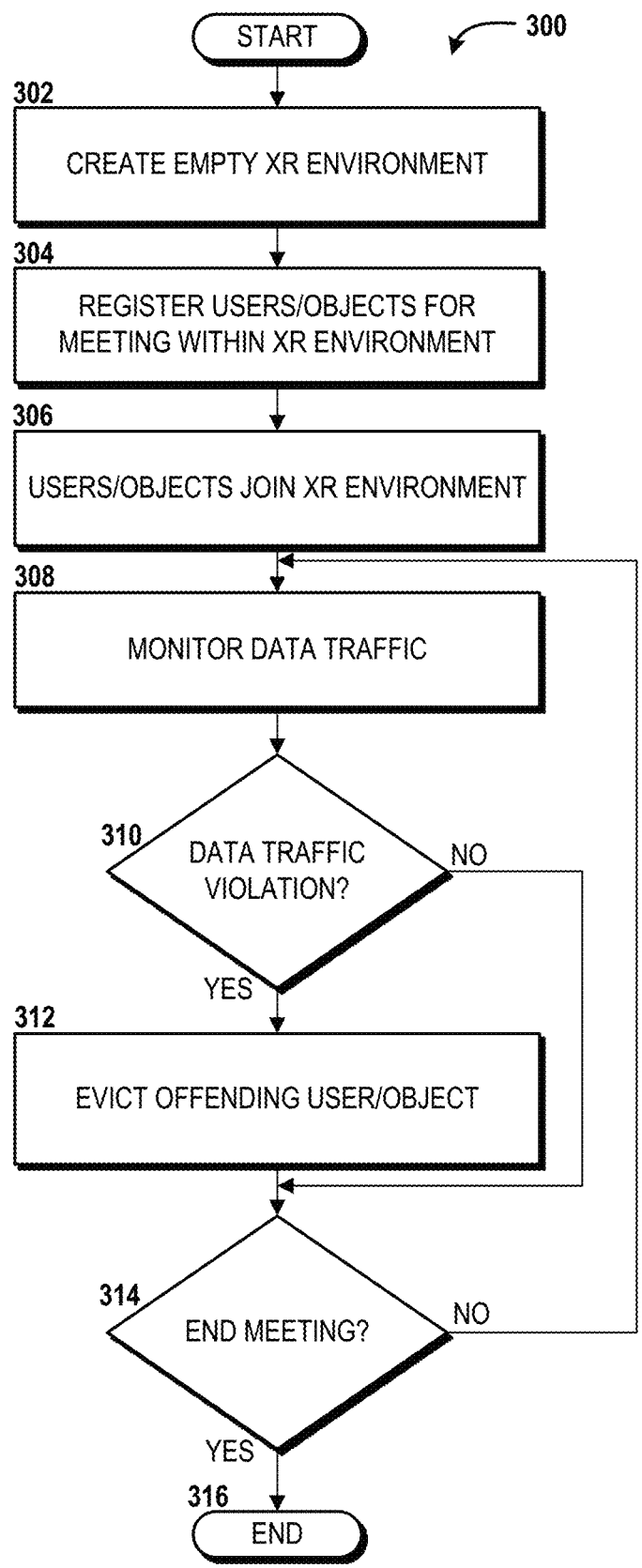
FIG. 3 is a flow diagram illustrating aspects of a method for providing a split ledger for securing XR environments, according to an illustrative embodiment.

Turning now to FIG. 3, aspects of a method 300 for providing a split ledger 122 for securing XR environments 110 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in their respective entireties. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the XR server computer 102, the user device 106, the logging system 120, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the XR server computer 102, the user device 106, or the logging system 120, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the XR server computer 102, the user device 106, the logging system 120, or some combination thereof, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 begins and proceeds to operation 302. At operation 302, the XR server computer 102 creates an empty XR environment, such as the secure XR environment 110, without any user avatars 116 and/or objects 118. As part of this creation process, the passed ledger 126 can be populated with room information (best shown in FIG. 2A). A hash of this information (shown as "hash_0 208") can be created and stored in the hash ledger 124.

From operation 302, the method 300 proceeds to operation 304. At operation 304, the XR server computer 102 registers the users 108 and the objects 118 (if applicable) for a meeting within the secure XR environment 110. As part of this registration process, the passed ledger 126 can be populated with the user-created blocks 128 for each of the users 108 and the object blocks 134 for each of the objects 118 (best shown in FIG. 2B). A hash of this information can be created and stored in the hash ledger 124. For example, the hash_1 224 for the first user-created block 128A, the hash_2 226 for the second user-created block 128B, and the hash_3 228 for the object block 134.

From 304, the method 300 proceeds to operation 306. At operation 306, the users 108 and/or objects 118, registered at operation 304, join the secure XR environment 110. The method 300 assumes that all users 108 and objects 118 joining the secure XR environment 110 are legit—that is, have the correct hash. If, however, a particular user 108 or object 118 does not have the correct hash, then the users 108 can either work to fix the ledgers or leave the secure XR environment 110. From operation 306, the method 300 proceeds to operation 308. At operation 308, the XR server computer 102 monitors data traffic incoming into the secure XR environment 110 and data traffic outgoing from the secure XR environment 110. From operation 308, the method 300 proceeds to operation 310. At operation 310, the XR server computer 102 determines whether the data traffic is in violation. In some embodiments, the type and amount of data traffic incoming into the secure XR environment and the type and amount of data traffic outgoing from the secure XR environment can be defined in one or more smart contracts 136. If so, the method proceeds to operation 312. At operation 312, the XR server computer 102 evicts the offending user 108 and/or object 118 from the secure XR environment 110. From operation 312, the method 300 proceeds to operation 314. If, however, the XR server computer 102 determines that the data traffic is not in violation, the method 300 proceeds directly to operation 314.

At operation 314, the XR server computer 102 determines whether the meeting should be ended. For example, the meeting, and therefore the use of the secure XR environment 110, may be ended based on a specified end time. Alternatively, one or more of the users 108 may suggest that the meeting be ended, in which case the other users may vote to end the meeting. A meeting leader (e.g., a meeting creator or elected leader) may end the meeting without a vote. If the XR server computer 102 determines, at operation 314, that the meeting should be ended, the method 300 proceeds to operation 316. The method 300 can end at operation 316. If, however, the XR server computer 102 determines, at operation 314, that the meeting should continue, the method 300 returns to operation 308, and the method 300 proceeds as described above.

Figure 4:
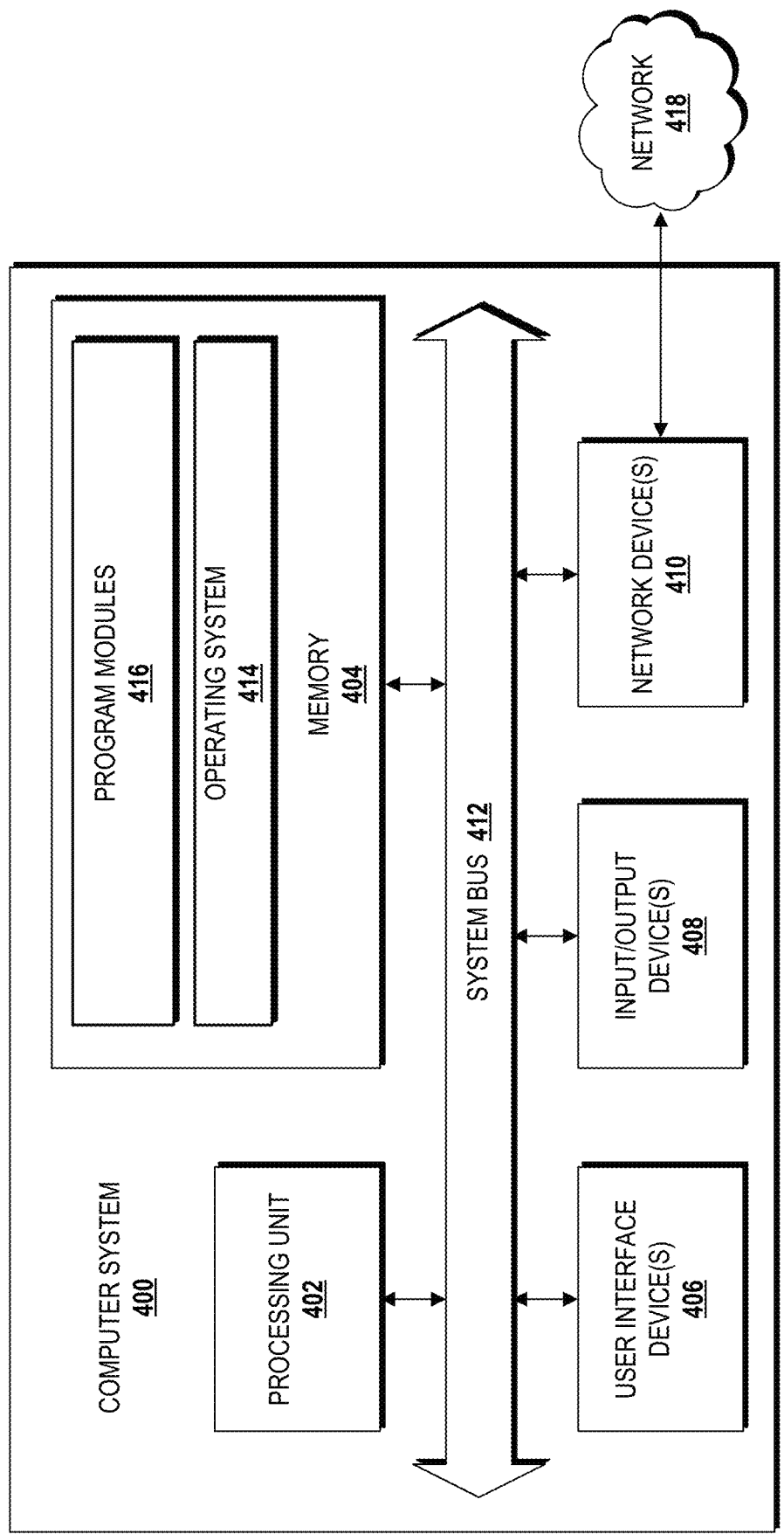
FIG. 4 is a block diagram illustrating an example computer system capable of implementing aspects of the embodiments presented herein.

FIG. 4 is a block diagram illustrating a computer system 400 configured to provide the functionality in accordance with various embodiments of the concepts and technologies disclosed herein. In some implementations, the untrusted XR server computer 102, the XR server computer 102, the user device 106, and/or the logging system 120 utilize an architecture that is the same as or similar to the architecture of the computer system 400. It should be understood, however, that modification to the architecture may be made to facilitate certain interactions among elements described herein.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the MAC OSX and/or iOS families of operating systems from APPLE CORPORATION, other operating systems, and the like. The operating system 414 can be the XR server OS 112 or the device OS 138 as illustrated and described with reference to FIG. 1.

The program modules 416 may include various software and/or program modules to perform the various operations described herein. The program modules 416 for the computer system 400 embodied as the XR server computer 102 can include the XR server application 114. The program modules 416 for the computer system 400 embodied as the user device 106 can include the XR app 140. The program modules 416 and/or other programs can be embodied in computer-readable media containing instructions that, when executed by the processing unit 402, perform one or more operations, such as the operations described herein above with reference to the method 300 illustrated in FIG. 3. According to embodiments, the program modules 416 may be embodied in hardware, software, firmware, or any combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display screen or a printer.

The network devices 410 enable the computer system 400 to communicate with other networks or remote systems via a network 418, such as the network(s) 121/500 (best shown in FIGS. 1 and 4). Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a wireless local area network ("WLAN"), a wireless wide area network ("WWAN"), a wireless personal area network ("WPAN") such as provided via BLUETOOTH technology, a wireless metropolitan area network ("WMAN") such as a WiMAX network or metropolitan cellular network. Alternatively, the network 418 may be a wired network such as, but not limited to, a wide area network ("WAN"), a wired LAN such as provided via Ethernet, a wired personal area network n ("PAN"), or a wired metropolitan area network ("MAN").

Turning now to FIG. 5, additional details of a network 500, such as the network(s) 121/418, are illustrated, according to an illustrative embodiment. The network 500 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, the user device 106, a cellular telephone, a user equipment, a mobile terminal, a PDA, a laptop computer, a handheld computer, and combinations thereof, can be operatively connected to the cellular network 502. The cellular network 502 can be configured as a 2G Global System for Mobile communications ("GSM") network and can provide data communications via General Packet Radio Service ("GPRS") and/or Enhanced Data rates for GSM Evolution ("EDGE"). Additionally, or alternatively, the cellular network 502 can be configured as a 3G Universal Mobile Telecommunications System ("UMTS") network and can provide data communications via the High-Speed Packet Access ("HSPA") protocol family, for example, High-Speed Downlink Packet Access ("HSDPA"), Enhanced UpLink ("EUL") (also referred to as High-Speed Uplink Packet Access ("HSUPA")), and HSPA+. The cellular network 502 also is compatible with 4G mobile communications standards such as Long-Term Evolution ("LTE"), or the like, as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system ("POTS"). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, the user device 106, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 500 is used to refer broadly to any combination of the networks 502, 504, 506. It should be appreciated that substantially all of the functionality described with reference to the network 500 can be performed by the cellular network 502, the packet data network 504, and/or the circuit switched network 506, alone or in combination with other networks, network elements, and the like.

Figure 6:
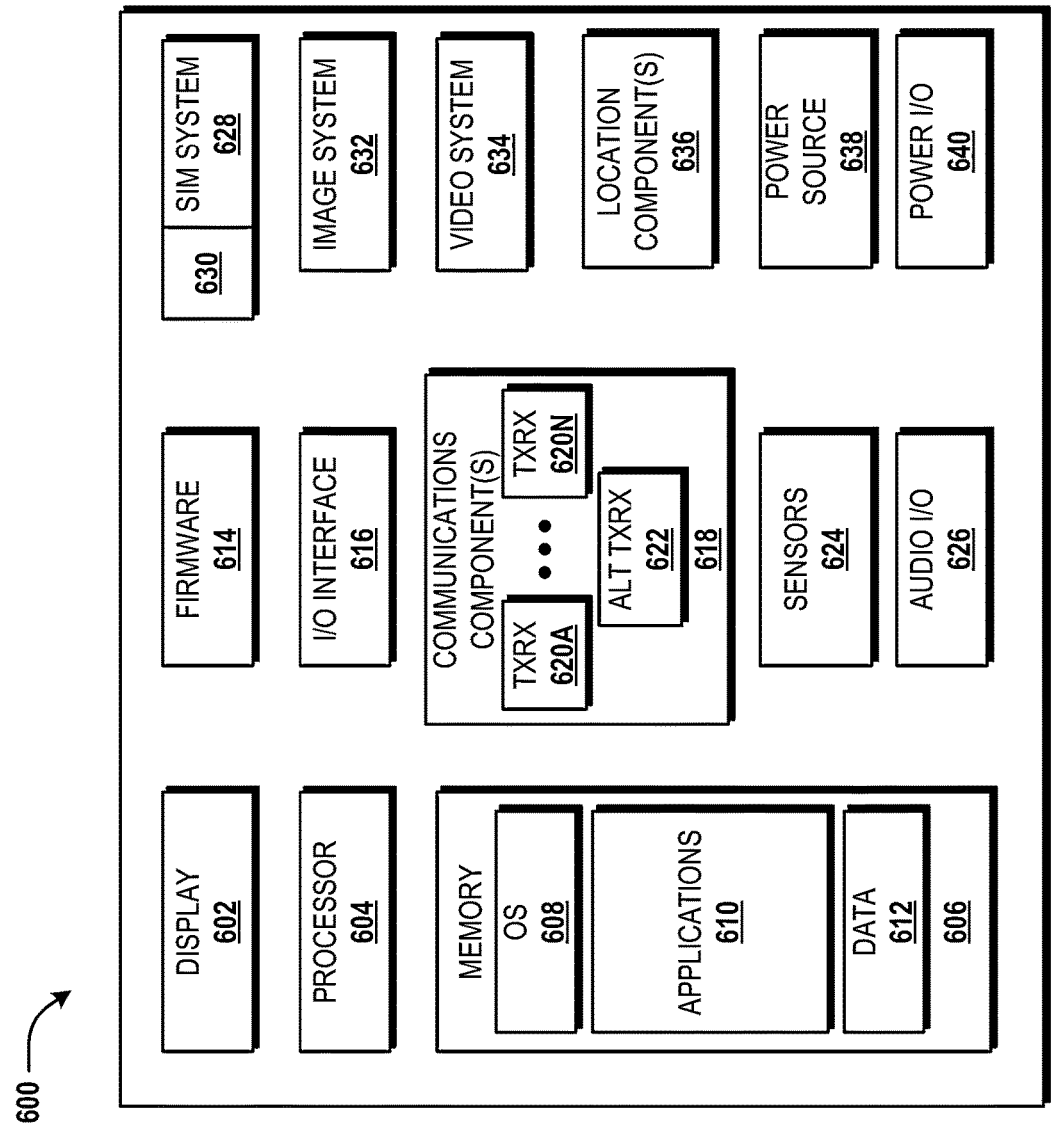
FIG. 6 is a block diagram illustrating an example mobile device and components thereof, according to an illustrative embodiment.

Turning now to FIG. 6, an illustrative mobile device 600 and components thereof will be described. In some embodiments, the user device 106 described above with reference to FIG. 1 can be configured as and/or can have an architecture similar or identical to the mobile device 600 described herein in FIG. 6. It should be understood, however, that the user device 106 may or may not include the functionality described herein with reference to FIG. 6. While connections are not shown between the various components illustrated in FIG. 6, it should be understood that some, none, or all of the components illustrated in FIG. 6 can be configured to interact with one other to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements, text, images, video, advertisements, prompts, virtual keypads and/or keyboards, messaging data, notification messages, metadata, internet content, device status, time, date, calendar data, device preferences, map and location data, combinations thereof, and the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608 (e.g., the device OS 138), one or more applications 610 (e.g., the XR app 140), other computer-executable instructions stored in a memory 606, or the like. In some embodiments, the applications 610 also can include a UI application (not illustrated in FIG. 6).

The UI application can interface with the operating system 608 to facilitate user interaction with functionality and/or data stored at the mobile device 600 and/or stored elsewhere. In some embodiments, the operating system 608 can include a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, viewing account information, answering/initiating calls, entering/deleting data, entering and setting user IDs and passwords for device access, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600.

According to various embodiments, the applications 610 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, user information, organization information, presence status information, user IDs, passwords, and application initiation (start-up) requests. In some embodiments, the I/O interface 616 can include a hardwire connection such as USB port, a mini-USB port, a micro-USB port, an audio jack, a PS2 port, an IEEE 1394 ("FIREWIRE") port, a serial port, a parallel port, an Ethernet (RJ46) port, an RJ11 port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, the XR component 142, combinations thereof, and the like. It should be appreciated that the I/O interface 616 may be used for communications between the mobile device 600 and a network device or local device.

The mobile device 600 also can include a communications component 616. The communications component 618 can be configured to interface with the processor 604 to facilitate wired and/or wireless communications with one or more networks described above herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMA, CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family, including HSDPA, EUL, or otherwise termed HSUPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-620N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near-field communications ("NFC"), other radio frequency ("RF") technologies, combinations thereof, and the like.

In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to a multimedia message service ("MIMS") message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from GPS devices, A-GPS devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, UV, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 600 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 600 in order to store and execute the software components presented herein. It is also contemplated that the mobile device 600 may not include all of the components shown in FIG. 6, may include other components that are not explicitly shown in FIG. 6, or may utilize an architecture completely different than that shown in FIG. 6.

Figure 7:
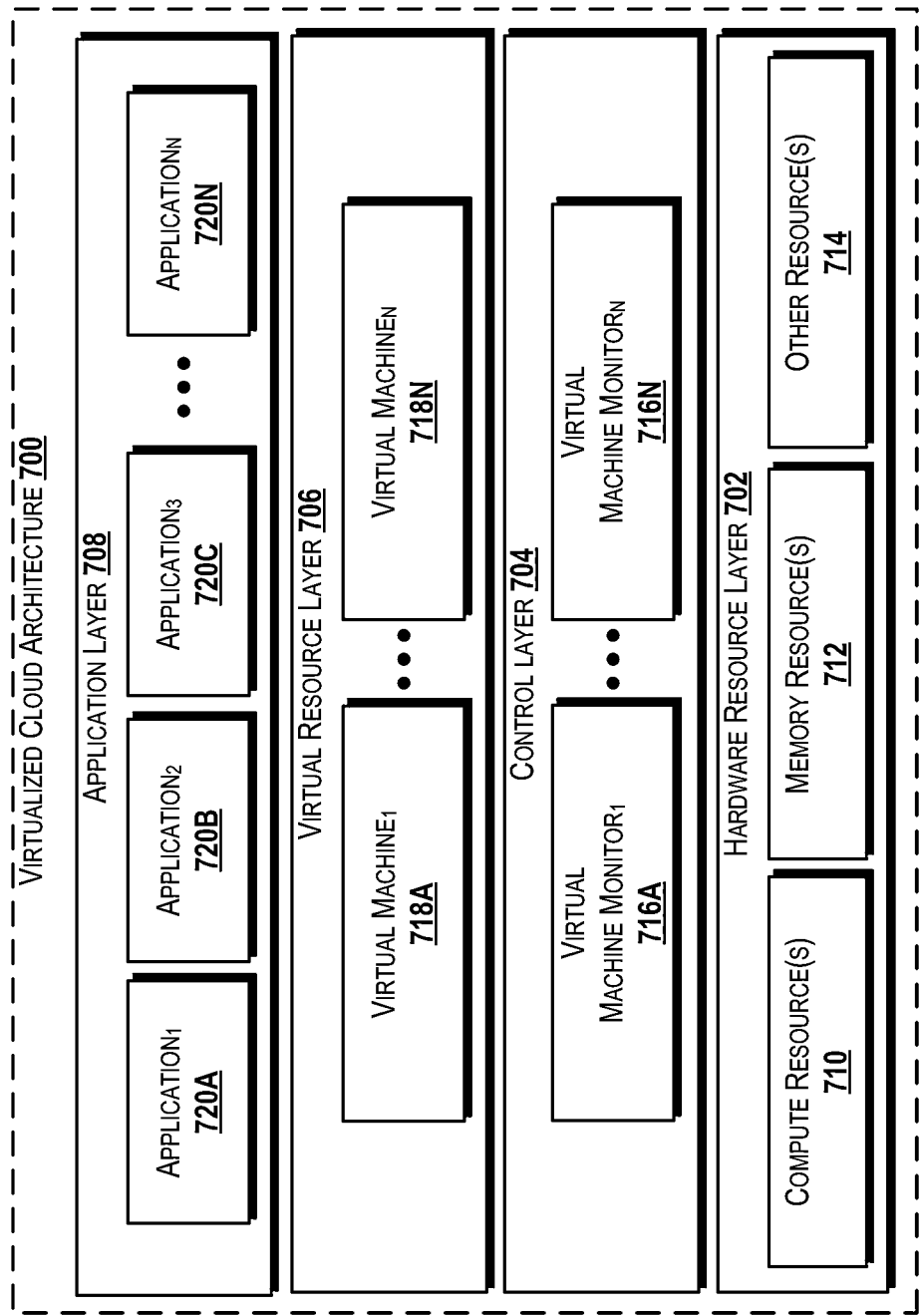
FIG. 7 is a diagram illustrating a virtualized cloud architecture capable of implementing aspects of the embodiments presented herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, the XR server computer 102, the logging system 120, aspects of the network(s) 121/500, portions thereof, and/or combinations thereof. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, California, and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors;" hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708. The applications 720A-720N can include the XR server OS 122 and/or the XR server application 114.

Based on the foregoing, it should be appreciated that concepts and technologies directed to split ledger for securing XR environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. An extended reality server computer comprising:
 a processor; and
 a memory that stores instructions that, when executed by the processor, cause the processor to perform operations comprising
  creating an extended reality environment,
  causing a passed ledger to be populated with an environment ID associated with the extended reality environment,
  causing a hash ledger to be populated with a first hash, wherein the first hash comprises a hash function applied to the environment ID,
  registering a user for participating in the extended reality environment,
  causing the passed ledger to be further populated with a user-created block associated with the user, wherein the user-created block contains a user ID that uniquely identifies the user,
  causing the hash ledger to be further populated with a second hash, wherein the second hash comprises the hash function applied to the user-created block,
  allowing a user avatar associated with the user to join the extended reality environment,
  causing the passed ledger to be populated with meeting information associated with a meeting to take place within the extended reality environment, and
  causing the passed ledger to be populated with an owner ID associated with an owner of the extended reality environment, wherein the first hash further comprises the hash function applied to the meeting information and the owner ID.

2. The extended reality server computer of claim 1, wherein the operations further comprise:
 causing the passed ledger to be populated with an object block associated with an object; and
 causing the hash ledger to be populated with a third hash, wherein the third hash comprises the hash function applied to the object block.

3. The extended reality server computer of claim 2, wherein the operations further comprise:
 monitoring data traffic incoming into and outgoing from the extended reality environment;
 determining whether the data traffic is in violation of a smart contract; and
 in response to determining that the data traffic is in violation of the smart contract, evicting an offending entity, wherein the offending entity comprises the user or the object.

4. The extended reality server computer of claim 1, wherein allowing the user avatar associated with the user to join the extended reality environment comprises providing the second hash to a user device, wherein the user device stores a copy of the passed ledger, and wherein the user device determines that the second hash has a match in the copy of the passed ledger.

5. The extended reality server computer of claim 4, wherein the passed ledger and the hash ledger are part of a split ledger, and the hash ledger is stored in a logging system.

6. The extended reality server computer of claim 5, further comprising the logging system.

7. A method comprising:
 creating, by an extended reality server computer comprising a processor, an extended reality environment;
 causing, by the extended reality server computer, a passed ledger to be populated with an environment ID associated with the extended reality environment;
 causing, by the extended reality server computer, a hash ledger to be populated with a first hash, wherein the first hash comprises a hash function applied to the environment ID;
 registering, by the extended reality server computer, a user for participating in the extended reality environment;
 causing, by the extended reality server computer, the passed ledger to be further populated with a user-created block associated with the user, wherein the user-created block contains a user ID that uniquely identifies the user;
 causing, by the extended reality server computer, the hash ledger to be further populated with a second hash, wherein the second hash comprises the hash function applied to the user-created block;
 allowing, by the extended reality server computer, a user avatar associated with the user to join the extended reality environment;
 causing, by the extended reality server computer, the passed ledger to be populated with meeting information associated with a meeting to take place within the extended reality environment; and
 causing, by the extended reality server computer, the passed ledger to be populated with an owner ID associated with an owner of the extended reality environment, wherein the first hash further comprises the hash function applied to the meeting information and the owner ID.

8. The method of claim 7, further comprising:
 causing, by the extended reality server computer, the passed ledger to be populated with an object block associated with an object; and causing, by the extended reality server computer, the hash ledger to be populated with a third hash, wherein the third hash comprises the hash function applied to the object block.

9. The method of claim 8, further comprising:
monitoring, by the extended reality server computer, data traffic incoming into and outgoing from the extended reality environment;
determining, by the extended reality server computer, whether the data traffic is in violation of a smart contract; and
in response to determining that the data traffic is in violation of the smart contract, evicting, by the extended reality server computer, an offending entity, wherein the offending entity comprises the user or the object.

10. The method of claim 7, wherein allowing the user avatar associated with the user to join the extended reality environment comprises providing the second hash to a user device, wherein the user device stores a copy of the passed ledger, and wherein the user device determines that the second hash has a match in the copy of the passed ledger.

11. The method of claim 10, wherein the passed ledger and the hash ledger are part of a split ledger, and the hash ledger is stored in a logging system.

12. The method of claim 11, wherein the logging system is part of the extended reality server computer or separate from the extended reality server computer.

13. A computer-readable storage medium comprising computer-executable instructions that, when executed by a processor of an extended reality server computer, cause the extended reality server computer to perform operations comprising:
creating an extended reality environment;
causing a passed ledger to be populated with an environment ID associated with the extended reality environment;
causing a hash ledger to be populated with a first hash, wherein the first hash comprises a hash function applied to the environment ID;
registering a user for participating in the extended reality environment;
causing the passed ledger to be populated with a user-created block associated with the user, wherein the user-created block contains a user ID that uniquely identifies the user;
causing the hash ledger to be populated with a second hash, wherein the second hash comprises the hash function applied to the user-created block;
allowing a user avatar associated with the user to join the extended reality environment;
causing the passed ledger to be populated with meeting information associated with a meeting to take place within the extended reality environment; and
causing the passed ledger to be populated with an owner ID associated with an owner of the extended reality environment, wherein the first hash further comprises the hash function applied to the meeting information and the owner ID.

14. The computer-readable storage medium of claim 13, wherein the operations further comprise:
causing the passed ledger to be further populated with an object block associated with an object; and
causing the hash ledger to be further populated with a third hash, wherein the third hash comprises the hash function applied to the object block.

15. The computer-readable storage medium of claim 14, wherein the operations further comprise:
monitoring data traffic incoming into and outgoing from the extended reality environment;
determining whether the data traffic is in violation of a smart contract; and
in response to determining that the data traffic is in violation of the smart contract, evicting an offending entity, wherein the offending entity comprises the user or the object.

16. The computer-readable storage medium of claim 13, wherein allowing the user avatar associated with the user to join the extended reality environment comprises providing the second hash to a user device, wherein the user device stores a copy of the passed ledger, and wherein the user device determines that the second hash has a match in the copy of the passed ledger.

17. The computer-readable storage medium of claim 16, wherein the passed ledger and the hash ledger are part of a split ledger, and
wherein the hash ledger is stored in a logging system.

* * * * *